(12) United States Patent
Renner

(10) Patent No.: US 7,021,708 B2
(45) Date of Patent: Apr. 4, 2006

(54) REMOVABLE MOTORCYCLE BACKREST AND SEAT

(76) Inventor: Richard Renner, 5963 SW. 43rd St., Davie, FL (US) 33314

(*) Notice: Subject to any disclaimer, the term of this patent is extended or adjusted under 35 U.S.C. 154(b) by 0 days.

(21) Appl. No.: 10/983,002

(22) Filed: Nov. 5, 2004

(65) Prior Publication Data

US 2005/0046250 A1 Mar. 3, 2005

(51) Int. Cl.
*B60N 2/00* (2006.01)

(52) U.S. Cl. ............... 297/230.1; 297/217.6; 280/288.4

(58) Field of Classification Search ......... 297/230.1, 297/230.14, 352, 215.11, 215.12, 217.6; 280/288.4, 751, 727; 180/311, 89.1
See application file for complete search history.

(56) References Cited

U.S. PATENT DOCUMENTS

| | | | |
|---|---|---|---|
| 1,240,587 A | 9/1917 | Mesinger | |
| 3,269,773 A | 8/1966 | O'Connor | |
| 3,545,790 A * | 12/1970 | Davis et al. ............. | 280/288.4 |
| 4,313,639 A | 2/1982 | Ware | |
| 4,570,998 A | 2/1986 | Hughes | |
| 4,967,179 A | 10/1990 | Solini | |
| 4,993,731 A * | 2/1991 | Fuller ..................... | 280/202 |
| D318,448 S | 7/1991 | Itakura et al. | |
| 5,072,339 A | 12/1991 | Shimojo | |
| 5,667,232 A * | 9/1997 | Gogan et al. ............ | 280/202 |
| 5,931,360 A | 8/1999 | Reichert | |
| 5,971,477 A * | 10/1999 | Bell et al. ............... | 297/195.1 |
| 6,068,334 A | 5/2000 | Bonfilio | |
| 6,135,473 A * | 10/2000 | Wright .................... | 280/202 |
| 6,347,804 B1 * | 2/2002 | Seibel ..................... | 280/288.4 |
| 6,428,096 B1 * | 8/2002 | Reitze ..................... | 297/217.6 |
| 6,648,408 B1 | 11/2003 | Grove | |
| 2004/0256897 A1 * | 12/2004 | Ziegler .................... | 297/215.12 |
| 2005/0110311 A1 * | 5/2005 | Tseng ...................... | 297/215.12 |

* cited by examiner

*Primary Examiner*—Milton Nelson, Jr.
(74) *Attorney, Agent, or Firm*—Laurence A. Greenberg; Werner H. Stemer; Ralph E. Locher

(57) ABSTRACT

A removable backrest assembly for a motorcycle with a rear fender includes a bracket disposed on each side of the rear fender and a backrest connected to the bracket at a top end thereof. The backrest has a shape of a spoiler. The backrest has a front side formed with a back pad and a rear side optionally formed with a brake light or turn signals. The assembly may also optionally include a removable seat for passenger.

16 Claims, 3 Drawing Sheets

REMOVABLE MOTORCYCLE BACKREST AND SEAT

BACKGROUND OF THE INVENTION

Field of the Invention

The invention lies in the field of motorcycle accessories. More specifically, the invention pertains to a removable motorcycle backrest and seat, which is particularly suitable for custom motorcycles.

The existing motorcycle accessories, such as back seats, are generally manufactured to suit for stock motorcycles. The back seats are generally attached to the rear fender by hooks or other attachment means. Since the rear fenders of stock motorcycles are relatively narrow and unsteady, the back seats are small and uncomfortable, and sometimes even unsafe.

Nowadays, with more and more people buying custom motorcycles, the motorcycle accessories available in the market that are suitable for stock motorcycles cannot satisfy the requirements of the custom motorcycle owners. The rear fenders of the customer-made motorcycles are generally much wider and steady, thus can support bigger and more comfortable back seats. In addition, the aesthetic aspects are also more emphasized for custom motorcycles.

The prior art is void of motorcycle accessories for custom motorcycles and, in particular, of a removable motorcycle backrest and seat, which is particularly satisfactory to custom motorcycle owners who have high demands in both functional and aesthetic aspects.

SUMMARY OF THE INVENTION

It is accordingly an object of the invention to provide a removable motorcycle backrest and seat, which overcomes the above-mentioned disadvantages of the heretofore-known motorcycle accessories and which is especially suitable for custom motorcycles. It is a specific object to provide a removable motorcycle backrest and seat where the backrest is formed as a spoiler, which combines the aesthetics and the functionality.

With the foregoing and other objects in view there is provided, in accordance with the invention, a removable motorcycle backrest and seat, comprising:

a bracket disposed on each side of the rear fender, the bracket having a top end and a bottom end; and a backrest connected to the bracket at the top end, the backrest having a shape of a spoiler, and the backrest having a front side formed with a back pad and a rear side.

In accordance with another feature of the invention, the assembly further comprises a mounting device for attaching the bracket to the rear fender.

In accordance with a further feature of the invention, the bracket has a catch formed at the bottom end, and the mounting device has a protrusion part resting in the catch.

In accordance with an added feature of the invention, the mounting device is a stationary disconnect mount.

In accordance with an additional feature of the invention, the stationary disconnect mount is a bullet bolt.

In accordance with yet another feature of the invention, the backrest has brake light or turn signals formed at the rear side of the backrest.

In accordance with yet a further feature of the invention, the backrest is painted with a color or pattern matching a color or pattern of the motorcycle.

In accordance with yet an added feature of the invention, the backrest is attached to the bracket by bolts.

With the above and other objects in view there is also provided, in accordance with the invention a removable backrest and seat assembly for a motorcycle with a rear fender and an existing seat, comprising:

a bracket disposed on each side of the rear fender, the bracket having a top end and a bottom end;

a backrest connected to the bracket at the top end, the backrest having a shape of a spoiler, the backrest having a front side formed with a back pad and a rear side; and a removable seat attached to the existing seat and disposed on the rear fender, the removable seat being attached to the bracket.

In accordance with a concomitant feature of the invention, the removable seat is attached to the bracket and the existing seat by bolts.

The novel removable motorcycle backrest and seat combines the functionality and the aesthetics to provide an eye-catching accessory for custom motorcycles. The prior art void concerning motorcycles accessories for custom motorcycles has thus been filled, by providing the easily configurable removable motorcycle backrest and seat that allows quick and easy assembly and adaptation to a variety of custom motorcycles. Furthermore, the elegant shape and color of the spoiler shaped backrest provides the customer with ultimate satisfaction.

Other features that are considered as characteristic for the invention are set forth in the appended claims.

Although the invention is illustrated and described herein as embodied in a modular display rack, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DETAILED DESCRIPTION OF PREFERRED EMBODIMENTS

Figure 1:
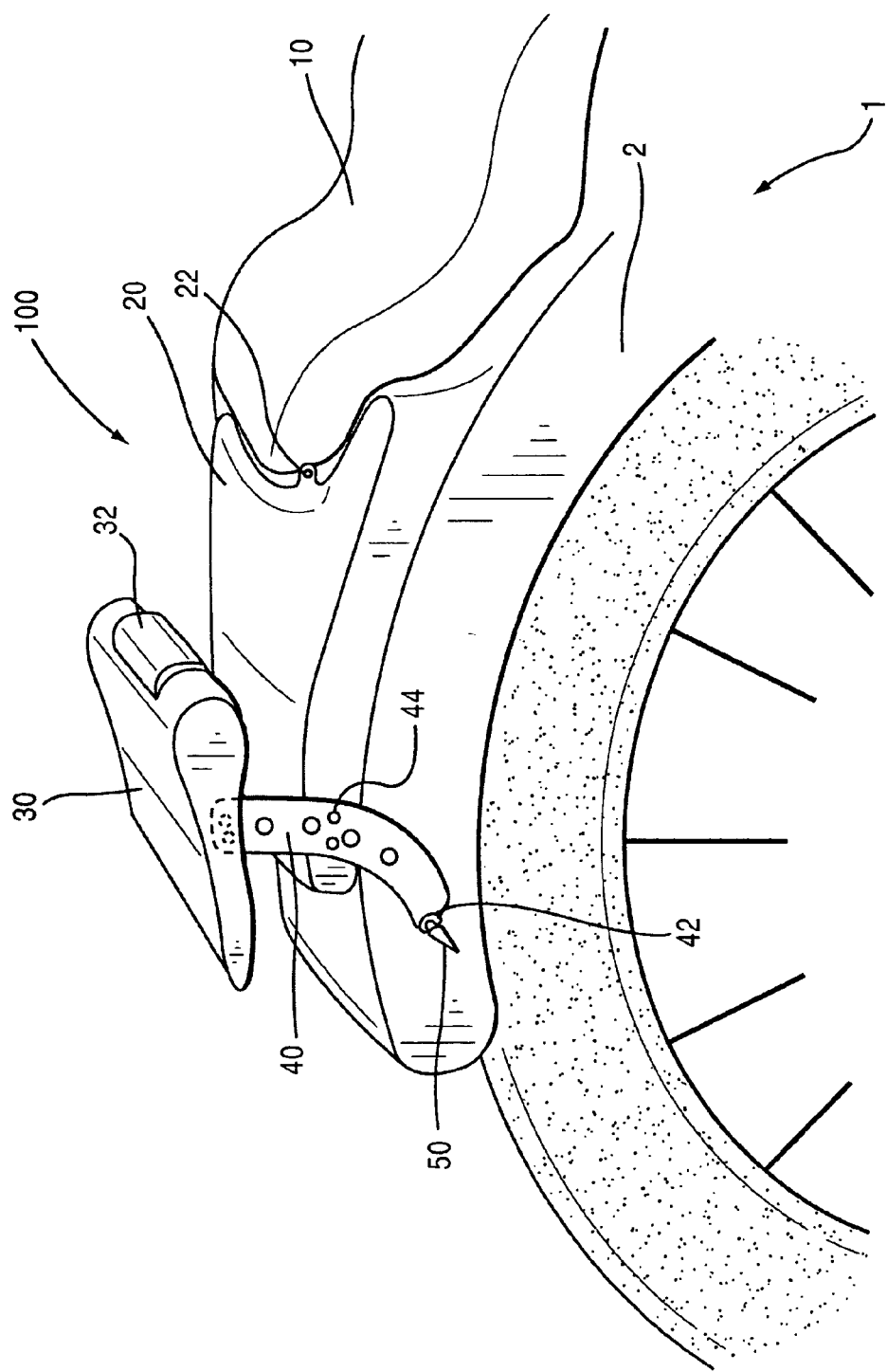
FIG. 1 is a fragmentary side perspective view of a motorcycle with the removable backrest and seat according to the invention.

Referring now to the figures of the drawing in detail and first, particularly, to FIG. 1 thereof, there is seen a side perspective view of a motorcycle 1 with the removable backrest and seat 100 according to the invention. The motorcycle 1 has a rear fender 2 and an existing seat 10. A removable seat 20 is attached to the existing seat 10 by bolts 22 or other appropriate means. A bracket 40 is provided on each side of the rear fender 2 and connected to the rear fender 2 through a stationary disconnect mount in the form of a bullet bolt 50. The bullet bolt 50 has a protrusion part protruding from the fender 2 outwardly. The protrusion part of the bullet bolt 50 rests in a catch 42 (see FIG. 3) formed at an end of the bracket 40. The removable seat 20 is attached to the brackets 40 through, for example, attachment bolts 44.

As can be seen in FIG. 1, the backrest 30 has the shape of a spoiler and is attached to the top of the brackets 40. The backrest 30 has a back pad 32 formed in the front side thereof for providing comfort for the passenger sitting on the removable seat 20. The spoiler shaped backrest 30 combines the functions of both a spoiler (reducing wind resist, increasing speed, etc.) and a backrest (providing comfort back support for passenger). The spoiler shape of the backrest also adds an elegant appearance to the motorcycle, especially, when it is painted in a color and pattern matching the color and pattern of the motorcycle.

Figure 2:
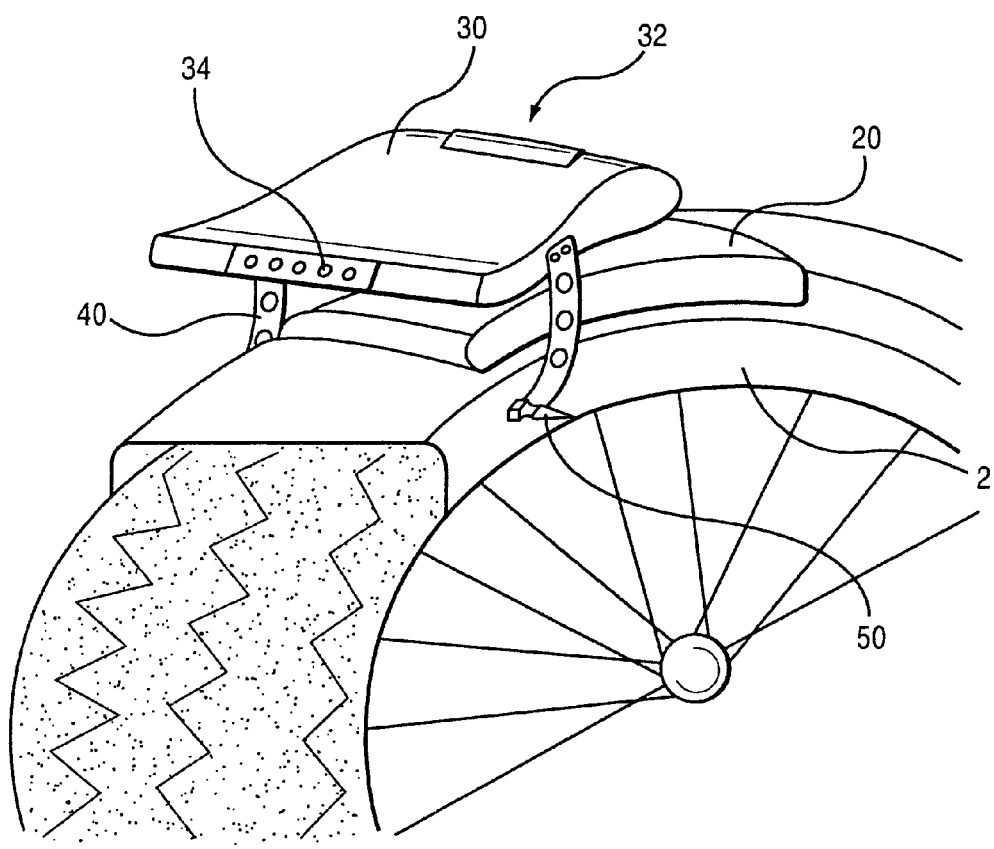
FIG. 2 is a fragmentary rear perspective view of a motorcycle with the removable backrest and seat according to the invention.

FIG. 2 shows the removable backrest and seat 100 according to the invention in a different angle. As can be seen in FIG. 2, the backrest 30 can be optionally provided with a brake light or turn signals 34 at the rear side thereof.

Figure 3:
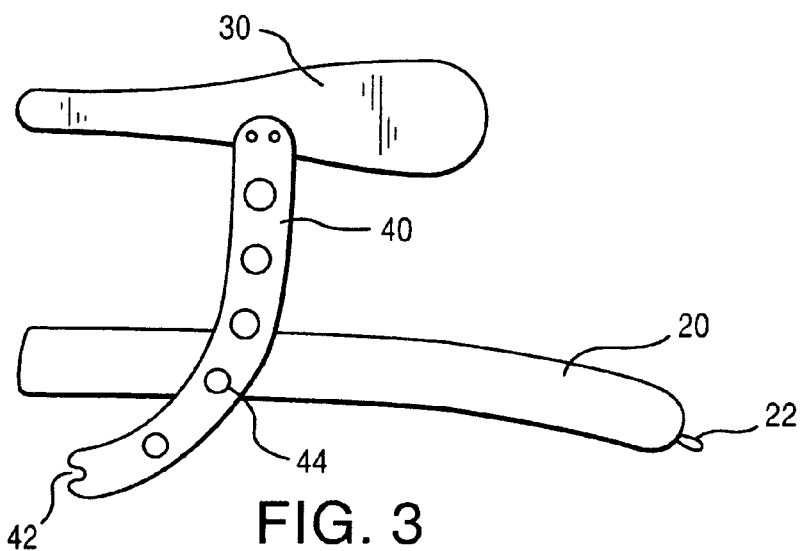
FIG. 3 is a side view of the removable backrest and seat according to the invention.
Figure 4:
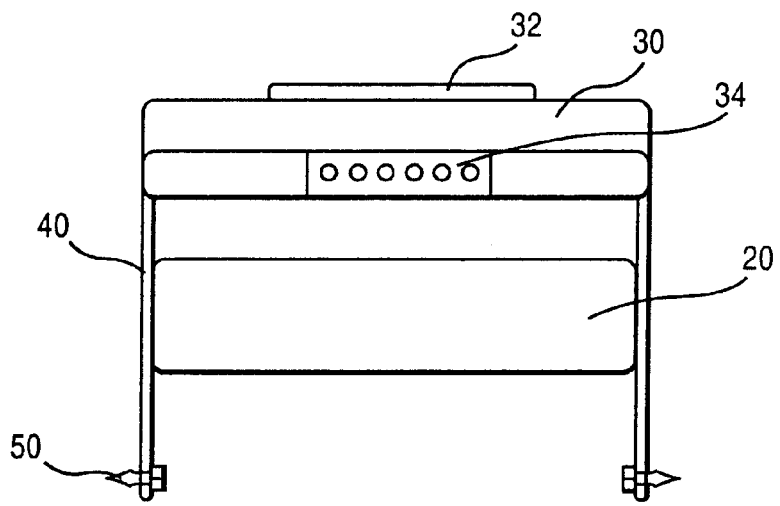
FIG. 4 is a back view of the removable backrest and seat according to the invention.
Figure 5:
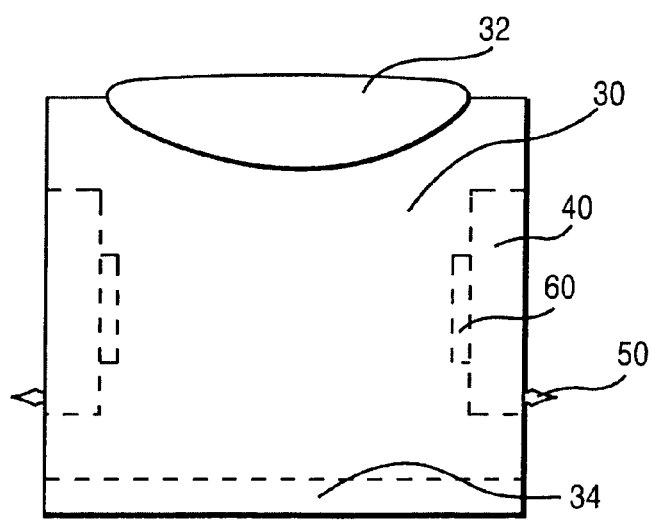
FIG. 5 is a top view of the removable backrest and seat according to the invention.

FIGS. 3–5 are schematic side, rear, and top views of the removable backrest and seat 100 according to the invention, respectively. As can be seen in FIG. 5, a spacer 60 may be provided at each side of the rear fender 2 for adapting to different widths of the fenders. The removable backrest and seat 100 according to the invention can generally fit Harleys or other custom motorcycles with tires having a width of 220–300 mm.

The height of the backrest 30 is adjusted to a height that is comfortable for the passenger sitting on the removable seat 20 to rest his or her back and provides aesthetic effect. The shape of the backrest 30 can be chosen to match individual tastes and preferences. The material for the backrest and the bracket can be, for example, mild steel and the material for the removable seat can be, for example, vinyl.

The backrest 30 and the removable seat 20 can be sold separately. The customer can choose only to install the backrest simply as a spoiler or install both the backrest and the seat together.

As already mentioned before, since the custom motorcycles have a wide and steady rear fender, it is possible to make the backrest and seat wide and comfortable. The steady rear fender can also provide strong support for the brackets, which in turn support the backrest and the removable seat.

Other embodiments of the invention will be apparent to those skilled in the art from consideration of the specification and practice of the invention disclosed herein. It is intended that the specification and examples be considered as exemplary only.

I claim:

1. A removable backrest assembly for a motorcycle with a rear fender, comprising:
   a bracket to be disposed on each side of the rear fender, said bracket having a top end and a bottom end; and
   a backrest connected to said bracket at said top end, said backrest having a shape of a spoiler, said backrest having a front side formed with a back pad and a rear side;
   said backrest having brake light or turn signals formed at said rear side of said backrest.

2. The assembly according to claim 1, further comprising a mounting device for attaching said bracket to the rear fender.

3. The assembly according to claim 2, wherein said bracket has a catch formed at said bottom end, said mounting device having a protrusion part resting in said catch.

4. The assembly according to claim 2, wherein said mounting device is a stationary disconnect mount.

5. The assembly according to claim 4, wherein said stationary disconnect mount is a bullet bolt.

6. The assembly according to claim 1, wherein said backrest is attached to said bracket by bolts.

7. The assembly according to claim 1 in combination with a motorcycle, wherein the motorcycle has a color or pattern and said backrest is painted with a color or pattern matching the color or pattern of the motorcycle.

8. A removable backrest and seat assembly for a motorcycle with a rear fender and an existing seat, comprising:
   a bracket to be disposed on each side of the rear fender, said bracket having a top end and a bottom end;
   a backrest connected to said bracket at said top end, said backrest having a shape of a spoiler, said backrest having a front side formed with a back pad and a rear side; and
   a removable seat to be attached to the existing seat and to be disposed on the rear fender, said removable seat being attached to said bracket.

9. The assembly according to claim 8, wherein said backrest is attached to said bracker by bolts.

10. The assembly according to claim 8, wherein said removable seat is to be attached to said bracket and the existing seat by bolts.

11. The assembly according to claim 8, further comprising a mounting device for attaching said bracket to the rear fender.

12. The assembly according to claim 11, wherein said bracket has a catch formed at said bottom end, said mounting device has a protrusion part resting in said catch.

13. The assembly according to claim 11, wherein said mounting device is a stationary disconnect mount.

14. The assembly according to claim 13, wherein said stationary disconnect mount is a bullet bolt.

15. The assembly according to claim 8, wherein said backrest has brake light or turn signals formed at said rear side of said backrest.

16. The assembly according to claim 8, in combination with a motorcycle, wherein the motorcycle has a color or pattern and said backrest is painted with a color or pattern matching the color or pattern of the motorcycle.

* * * * *